Patented Nov. 13, 1934

1,980,396

UNITED STATES PATENT OFFICE 1,980,396

REACTION PRODUCT OF BUTADIENE DERIVATIVES WITH HYDROGEN HALIDES AND METHOD OF PRODUCING SAME

Erich Gebauer-Fuelnegg, Evanston, Ill., and Eugene W. Moffett, Gary, Ind., assignors to Marsene Corporation of America, Gary, Ind., a corporation of Indiana No Drawing. Application December 23, 1933, Serial No. 703,866

15 Claims. (Cl. 260—1)

This invention relates to the preparation of butadiene or diolefine hydrogen halides and their derivatives, particularly adapted for use in the manufacture of thin, transparent, flexible sheet material.

It has been proposed to make transparent sheet material from rubber which has been treated with chlorine or hydrogen chloride in various ways. However, rubber hydrochlorides have possessed the disadvantage that they are unstable at high temperatures, and are not capable of being formed into clear, transparent, permanently flexible films or sheets, unless specially purified or treated.

In the present invention, a reaction is obtained between hydrogen chloride or other hydrogen halides and rubber or other products containing a large proportion of a butadiene or an erythrene derivative without the use of solvents. The product obtained is stable at higher temperatures than the products previously known and contains no opaque matter to interfere with the transparency of the sheet material made therefrom.

A further disadvantage of the processes previously proposed has been that the reaction between the rubber and hydrogen chloride was a matter of hours while the action occurring in the process which is disclosed hereinafter is almost instantaneous. In some modifications of this process, as short a time as one minute is ample to complete the reaction.

It is, then, an object of this invention to provide a reaction product of a butadiene or diolefine and a hydrogen halide which is adapted to make relatively stable, colorless, thin transparent sheet material.

It is a further object of this invention to provide a process whereby the above described reaction product of a butadiene or diolefine and a hydrogen halide may be produced in an economical and satisfactory manner.

Other and further objects of this invention will be evident from the following specification and the accompanying claims.

Rubber and rubber-like substances as used in this specification include substances having the following nuclear formula:

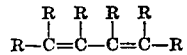

in which R may be suitable substituent groups, such as for example, alkyl, aryl, halogen, hydrogen, etc. This is a general formula for a group of hydrocarbons of which butadiene or erythrene is the simplest member. Members of this group of substances, generically referred to as butadiene bodies and their polymers, are operative in the present process. The principal active ingredients of naturally occurring materials, such as rubber, gutta percha, balata, etc., belong to this group of hydrocarbons. These naturally occurring substances are the preferred starting materials in the commercial operation of the present process. However, it will be understood that butadiene, isoprene and similar substances produced by artificial means are also operative. In fact, diolefines of the general formula $C_nH_{2n-2}$ are operative for the purposes of our invention.

It has previously been considered necessary to employ some type of solvent in the treatment of rubber with hydrogen chloride. The present process involves the employment of a dry hydrogen halide, either liquid or gaseous, which is brought into direct contact with the rubber or similar substance containing a butadiene derivative until the chemical action is completed. This is done directly without the aid of any solvents either for the rubber or the hydrogen halide. When unvulcanized rubber and hydrogen chloride are used, this process produces a type of rubber hydrochloride which is superior to any made by prior methods. Thin transparent sheets made from it are relatively stable at 100° C., while prior products undergo decomposition when raised to temperatures as low as 80° C. We are aware that Harries (Ber. 46,733 1913) alleges that a product produced by him decomposes slowly at 145° C., but we have found that these prior products will always decompose at about 80° C. when made up into thin sheets. By decomposition is meant the disintegration of the material in the direction of the starting materials, viz. hydrogen chloride and rubber. This causes the sheet to become stretchy or elastic.

The present process is a distinct advance in that the time required for the reaction is cut from several hours to not more than a few minutes, and there is no loss of any expensive solvents. In addition to this, a product is produced which does not contain any opaque matter or impurities which would discolor or render foggy the finished sheet material.

The following procedure in which isoprene is used, will illustrate this process in the treatment of a liquid butadiene derivative.

About 20 c. c. of isoprene is added to 10 c. c. of liquid hydrogen chloride in a test tube. A reaction takes place immediately, as is evidenced by the rapid boiling of the solution. The excess of hydrogen chloride is allowed to evaporate and the resulting product is dried over calcium chloride to remove the slight amount of moisture which, if no precautions are taken, will condense along with the liquefied HCl. The resulting liquid becomes brown and viscous on exposure to air and light. When subjected to distillation, this product boils over a considerable range, showing that some polymerization has taken place.

As an example of this process, as applied to a solid butadiene derivative, the following procedure using rubber and hydrogen chloride is given:

This is the preferred modification of the process since at present these are the cheapest and most readily available of any of the operative substances. It will be understood, however, that synthetic rubber derivatives, such as duprene and chloroprene, may also be used, since the reaction is a general one.

Any unvulcanized rubber, either milled or unmilled, is suitable, though pale crepe is preferred to smoked rubber, since the final product will be lighter in color. The rubber or other product should be made into thin sheets or some other form in which all parts of the material are readily accessible to the hydrogen halide with which it is to react. Other forms of rubber, such as powdered rubber, will also react satisfactorily.

Milling the rubber has the effect of increasing the plasticity of the finished sheet material. In other words, a harder sheet is produced when unmilled rubber is used. The use of milled rubber has the additional advantage that the resulting rubber hydrochloride is more readily soluble in the solvents used in preparing the sheet material than when unmilled rubber is employed. Pale crepe rubber milled to a Williams plasticity of 210 and dead milled rubber having a Williams plasticity of 120 have been successfully used in this process. By dead milled rubber is meant rubber which has been milled until further milling will produce no further change.

In this state, the rubber may be brought into contact with liquefied hydrogen chloride for a short time, for example, one minute or less. During this time, the reaction is completed and the rubber is converted into a material which, upon evaporation of the excess hydrogen chloride, has a spongy, asbestos-like structure, almost white in appearance. This product appears to be a rubber hydrochloride, although it is more stable than other rubber hydrochlorides which have been produced. This fact indicates that the product may differ chemically from previously known compounds of rubber and hydrogen chloride.

When thick sheets of rubber are used, a longer period will be required to complete the reaction. For example, if the sheets have a thickness of .020–.040 inch, as much as five minutes may be required, while one minute or less will be sufficient for a sheet having a thickness of .015 inch.

When the reaction is complete, this product contains about 28% or more of chlorine.

This method of practicing the invention requires the use of sufficient pressure to cause the hydrogen halide to remain liquid, or a sufficiently reduced temperature to accomplish this result, or some combination of both in accord with the well-known gas laws. Any suitable autoclave or other container adapted to hold gas under pressure or at a low temperature, or both, may be used in the above described process, and any suitable refrigerating means may be employed to keep the hydrogen halide cool.

It is not necessary, however, that the hydrogen halide be used in a liquid state. When applied as a gas under pressure, a similar product will be produced, but the reaction proceeds much more slowly, probably due to the fact that the gaseous hydrogen halide is less concentrated than the liquid form. In this respect, the speed of the reaction is comparable to the reaction of HCl and rubber dissolved in a solvent. When this method is employed, the rubber or other butadiene derivative is exposed to the action of the gas, either at atmospheric or more than atmospheric pressure and at any temperature below that at which the finished product decomposes, say below about 100° C., in the case of a rubber hydrochloride. The reaction may be conducted in any gas tight container or autoclave and the speed of the reaction may be increased by increasing the pressure of the hydrogen chloride gas.

This modification of the process is considerably slower than when liquid hydrogen chloride is used. For example, in the case of rubber and hydrogen chloride, if a pale crepe rubber having a thickness of .02 inch is used and the hydrogen chloride is kept at atmospheric pressure, the reaction will be substantially complete in about 36 hours. However, if the pressure is increased to 10 atmospheres, the reaction will be substantially complete in about 8 hours. Catalysts, such as $AlCl_3$, can be used to increase the rate of the reaction.

When this process is carried out as above disclosed, no separate step of drying or purifying of the product is necessary. It is, however, advisable to keep the product dry. Any residual free hydrogen halide in the solid rubber hydrochloride will dissipate itself very quickly, leaving no residue. If desired, the excess hydrogen halide remaining in the sheet after the reaction is complete may be removed by suitable means, such as a vacuum or increased temperature, or a combination of the two, and collected for use in treating a further quantity of the material. No undesirable impurities are thus introduced or formed during the reaction.

It will be understood that the reaction may be stopped at any desired point by removing the rubber or other material from the hydrogen chloride before the reaction is complete. The reaction product resulting from this procedure will be only partly saturated.

The use of dry, liquid hydrogen chloride lends itself admirably to the carrying out of the process for making rubber hydrochloride in a continuous operation.

We are aware that Weber, (Ber. 33,779, 1900) states that he was unable to produce a product of constant composition by the action of gaseous hydrogen chloride under atmospheric conditions on rubber. Although Weber fails to give any details as to his process, he does state that his product contained from 11 to 18% of chlorine, whereas our process may be readily carried out to produce a product having a chlorine content of 28% or over.

We are aware that numerous details of the process may be varied through a wide range without departing from the principles of this invention, and we, therefore, do not purpose limiting the patent granted hereon otherwise than necessitated by the prior art.

We claim as our invention:

1. In a process for producing a compound of a hydrogen halide and a butadiene body, the step of subjecting said butadiene body directly to the action of liquefied hydrogen halide.

2. In a process for producing a compound of hydrogen chloride and rubber, the step of reacting said rubber directly with liquefied hydrogen chloride.

3. The process of producing a compound of hydrogen chloride and rubber, which comprises exposing unvulcanized rubber to the action of liquefied hydrogen chloride, until a product is obtained which, after evaporation of the excess hydrogen chloride, has a spongy, white, asbestos-like structure.

4. In a process for producing a compound of hydrogen chloride and rubber, the step of subjecting pale crepe rubber to the action of liquefied hydrogen chloride until no further action takes place.

5. In a process for producing a compound of hydrogen chloride and rubber, the step of subjecting rubber to the action of liquefied hydrogen chloride for a time sufficient to produce only a partial reaction between the hydrogen chloride and the rubber.

6. The process of preparing a hydrohalide addition product of a butadiene body, which comprises reacting a butadiene body with a dry hydrogen halide in the presence of an excess of said hydrogen halide and in the absence of a solvent to form the hydrohalide addition product of said butadiene body and evaporating off any unreacted hydrogen halide to isolate said addition product.

7. The process of preparing a hydrochloride addition product of a butadiene body, which comprises reacting a butadiene body with substantially dry gaseous hydrogen chloride in the absence of a solvent and in the presence of an excess of said gaseous hydrogen chloride under pressure to form the hydrogen chloride addition product of said butadiene body and eliminating any unreacted hydrogen chloride from said addition product to isolate said addition product.

8. The process of preparing a hydrohalide addition product of rubber, which comprises reacting rubber with a dry hydrogen halide in the absence of a solvent and in the presence of an excess of said hydrogen halide to form the hydrohalide addition product of said rubber and eliminating any unreacted hydrogen halide from said addition product to isolate said addition product.

9. The process of preparing a hydrochloride addition product of rubber, which comprises reacting rubber with dry hydrogen chloride in the absence of a solvent and in the presence of an excess of hydrogen chloride to form the hydrochloride addition product of said rubber and eliminating any unreacted hydrogen chloride from said addition product to isolate said addition product.

10. The process of producing rubber hydrochloride, which comprises reacting rubber with hydrogen chloride in liquefied form and evaporating off any unreacted hydrogen chloride from the resulting rubber hydrochloride.

11. The process of preparing a hydrohalide addition product of a butadiene body, which comprises reacting a butadiene body with a hydrogen halide in liquefied form to form the hydrohalide addition product of said butadiene body and evaporating off any unreacted hydrogen halide to isolate said addition product.

12. As a new product, a butadiene hydrohalide addition product obtained in accordance with the process defined by claim 6.

13. As a new product, a butadiene hydrohalide addition product obtained in accordance with the process defined by claim 11.

14. As a new product, a rubber hydrohalide obtained in accordance with the process defined by claim 8.

15. As a new product, rubber hydrochloride obtained in accordance with the process defined in claim 10.

ERICH GEBAUER-FUELNEGG.
EUGENE W. MOFFETT.